United States Patent

[11] 3,589,017

[72] Inventor James Kyle
21760 Beechwood, East Detroit, Mich. 48021
[21] Appl. No. 821,012
[22] Filed May 1, 1969
[45] Patented June 29, 1971

[54] BORE GAUGE
7 Claims, 5 Drawing Figs.

[52] U.S. Cl. .................................................. 33/178 R,
33/147 K, 33/162
[51] Int. Cl. ...................................................... G01b 5/12
[50] Field of Search .......................................... 33/147 F,
162, 178, 164 C, 143 D, 143 G

[56] References Cited
UNITED STATES PATENTS
2,663,942 12/1953 Rudolph ...................... 33/164
2,957,247 10/1960 Brown et al. .................. 33/147
1,695,453 12/1928 Carpenter ..................... 33/178 R
2,329,067 9/1943 Maag ............................ 33/178
3,233,329 2/1966 Richter ......................... 33/147 K FOREIGN PATENTS
322,301 6/1957 Switzerland .................. 33/147

Primary Examiner—Leonard Forman
Assistant Examiner—Gary G. Kuehl
Attorney—Whittemore, Hulbert & Belknap ABSTRACT: The bore gauge is for measurement of the inside diameter of openings in a body. It includes a pair of oppositely disposed blades each having a sensing element at one end for extension into contact with the interior surface of the opening to measure the opening size. A rod structure is operatively connected to the blades by means of a pin and slot arrangement to cause blade movement. Measuring means are provided to measure displacement of the rod, which is related to displacement of the sensing elements, to thereby indicate the inside diameter of an opening.

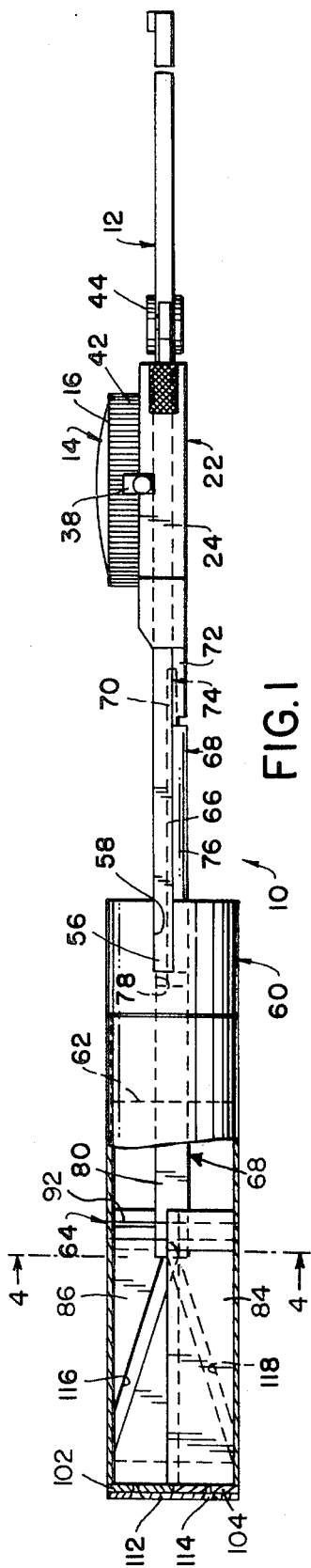
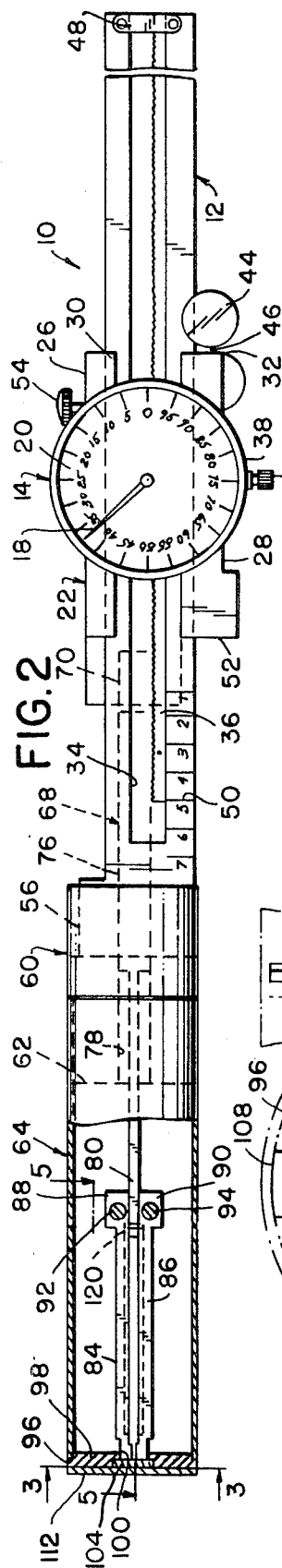
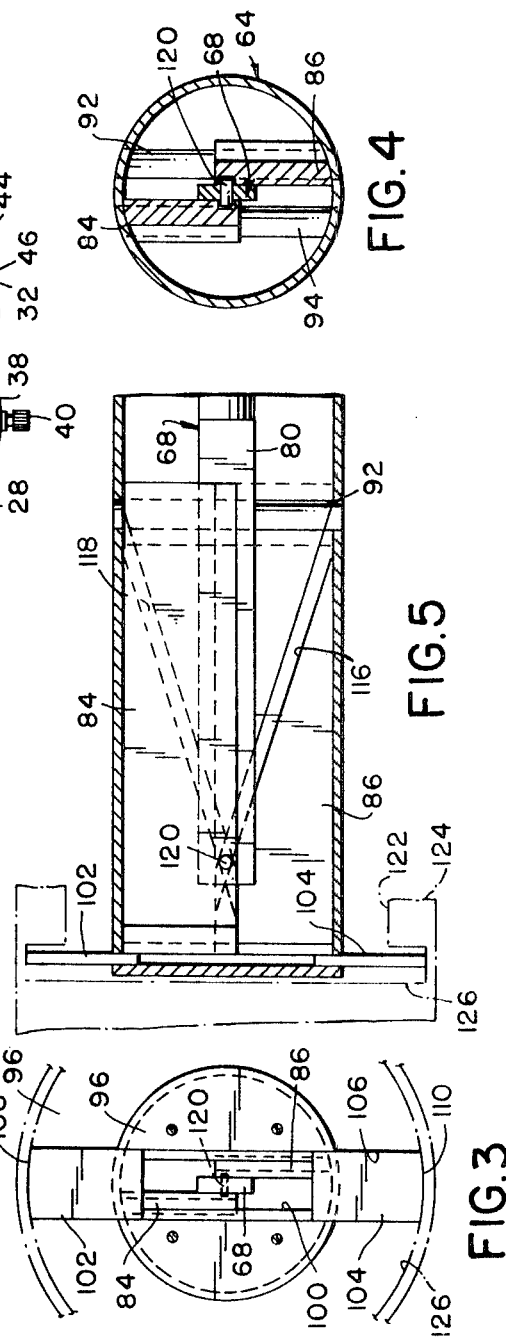
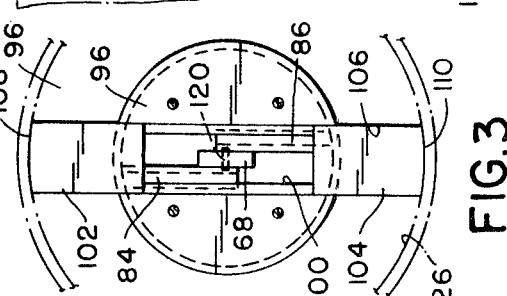
INVENTOR.
JAMES KYLE 3,589,017

BORE GAUGE

BACKGROUND OF THE INVENTION

Numerous styles of bore gauges for measuring the inside diameter of openings in a body have been proposed in the past. For many purposes, such previous bore gauges have proved entirely satisfactory. However, many of such previous devices have been somewhat difficult to use because they are not direct reading and have also needed presetting in order to obtain an accurate reading. Further, there have been severe limitations in use of such prior devices in connection with measuring a groove in a body which is connected to the outside of the body by means of a smaller diameter opening. Because of the physical size of the sensors or measuring pieces of the prior art gauges, it has not been possible to measure the inside diameter of a groove when the thickness of the groove did not permit entry of the relatively large measuring piece.

In accordance with the present invention, a bore gauge is provided which is of the direct-reading type and which does not need presetting. The bore gauge can be used to measure grooves which are relatively thin, for example, 0.050 inch in thickness. Additionally, the bore gauge of the present invention may be manipulated by use of only one hand thus leaving the other hand free to hold the part being measured or the like. Further, the present invention is capable of a relatively wide range, whereas previous devices of this general type have been capable of only relatively small range. For example, one prior art gauge of the general type presently under consideration has a range of 0.210 inch. The present device may be provided with a range of 0.630 inch. It will thus be appreciated that a single device of the present invention may be utilized to replace three of the prior art devices. Devices of the invention capable of measuring an opening having a minimum diameter of 0.490 inch to a maximum diameter of 4.000 inches may be provided.

SUMMARY OF THE INVENTION

A bore gauge is provided for measurement of the inside diameter of openings in a body. The bore gauge comprises a pair of oppositely disposed blades which are carried in a support structure including slide means upon which the blades are mounted for motion in opposite directions. A sensing element is provided at one end of each blade for extension into contact with the interior surface of an opening. A rod structure is slidably mounted in said support structure and operatively connected to said blades to simultaneously move the blades on opposite directions transversely with respect to movement of the rod structure. Means are provided to measure the displacement of the rod structure and thus the displacement of the sensing elements. The means operatively connecting the rod structure to the blades comprise a pair of projections each extending outwardly from an opposite side of the rod structure. The rod structure extends between the blades. Each of the blades has a diagonal recess in the oppositely disposed faces thereof. These recesses are at reverse angles with respect to each other whereby they cross over each other. The projections on the rod structure extend into the recesses at the point of crossing of the recesses whereby displacement of the rod structure causes the projections to cam the blades to result in said blade movement.

In the drawing:

FIG. 1 is a side elevational view of a bore gauge forming one embodiment of the present invention with a portion broken away and in cross section and showing the gauge in a closed position;

FIG. 2 is a plan view of the bore gauge of FIG. 1 with a portion broken away and in cross section;

FIG. 3 is an end view taken substantially along the line 3-3 of FIG. 2 looking in the direction of the arrows and showing the gauge in an expanded position;

FIG. 4 is a sectional view taken substantially along the line 4-4 of FIG. 1 looking in the direction of the arrows; and FIG. 5 is a sectional view taken substantially along the line 5-5 of FIG. 2 looking in the direction of the arrows and showing the gauge in an expanded position.

The bore gauge 10 includes an elongated linear caliper 12 upon which a dial indicator 14 is slidably mounted. The dial indicator 14 is of conventional structure and includes a casing 16 in which is mounted gear structure for actuating a dial pointer 18 which is exteriorly visible. A faceplate 20 is provided behind the dial pointer 18. The faceplate 20 has indicia thereon indicating from zero to 0.100 of an inch. The dial indicator 14 is mounted on a slide 22. The slide 22 comprises a bottom wall 24, sidewalls 26, 28, and inturned top flanges 30, 32 which define a central opening therethrough. The dial caliper 12 extends through the central opening. The slide 22 fits firmly on the dial caliper 12 but in smooth sliding relationship with respect thereto.

The dial caliper 12 has an elongated slotlike recess 34 therein which extends from a point adjacent the forward end thereof to the rear edge. A gear rack 36 is secured in the recess 34 adjacent one sidewall thereof with the gear teeth facing inwardly. A pinion gear (not shown) is provided on the underside of the dial indicator 14 in engagement with the rack 36 to cause the dial pointer 18 to rotate as the slide 22 moves longitudinally with respect to the dial caliper 12. The gear ratios are set, as in conventional, so that movement of the slide 22 will be directly and accurately recorded by movement of the dial pointer 18.

The dial faceplate 20 and associated structure are rotatably mounted on the dial indicator casing in order to permit setting of the dial indicator. A clamp 38 and thumbscrew 40 are provided to lock the dial plate in a given position. The thumbscrew 40 threadingly engages an opening in the sidewall 28 of the slide 22 and may be inwardly and outwardly threaded to engage or disengage the clamp 38 with the knurled portion 42. A thumb engageable double wheel 44 is rotatably mounted on a projection 46 of the side 22 to facilitate manual movement of the slide 22. A bar 48 is secured to the dial caliper 12 at the rear end thereof to prevent the slide 22 being inadvertently separated from the dial caliper 12.

Indicia marks 50 are provided on the surface of the dial caliper 12 at the forward portion thereof. The distance between each indicia mark 50 is equal to 0.100 of an inch. The edge 52 of the slide 22 is a ruler straightedge and is utilized to measure the forward travel of the slide 22 in terms of units of one hundred thousandths of an inch. The dial indicator 14 is utilized to measure the degree of forward travel between each indicia 50. This arrangement permits direct reading of the bore gauge 10 when measuring the inside diameter of an opening. It will be noted that there are seven indicia marks 50. This permits a maximum range of measurement of the bore gauge 10 of 0.700 inch. The device, however, may be designed to accommodate various ranges. In one specific model of the device, the range was 0.630 inch. However, the range may be increased from this figure or decreased as the need dictates.

A thumbscrew 54 threadingly engages an opening in the side 26 of the slide 22 for frictional engagement with the side of the dial caliper 12 to thereby maintain the slide 22 in any desired position with respect to the dial caliper 12.

The forward end 56 of the dial caliper 12 is received in a radial slot 58 provided in a cylindrical member or body 60. The cylindrical member 60 has a plug portion 62 of reduced diameter which is received in one end of a cylindrical tube 64. The plug 62 may be press fitted into the tube 64 and secured firmly in place by means of a punch applied to the exterior of the tube 64.

A slotlike recess 66 is provided on the underside of the dial caliper 12 at the forward portion thereof. A rod structure 68 is slidingly received in the recess 66. The rearward end 70 of the rod structure 68 has a flat striplike configuration and is received beneath a forward projection 72 of the slide 22. The rod structure 68 is secured to the slide 22 by means of screws 74 which extend through the projection 72 into threading engagement with the rod end 70. A semicylindrical portion 76 of the rod structure 68 extends forwardly of the end 70 through a similarly configured opening 78 in the cylindrical member 60. This arrangement serves to accurately guide the rod structure 68 in its longitudinal movement.

A flat striplike portion 80 of the rod structure 68 extends forwardly of the semicylindrical portion 76 through the opening 78. The portion 80 extends radially with respect to the semicylindrical portion 76 and is at substantially right angles to the flat surface thereof. The portion 80 is wider than the thickness of the portion 76. The opening 78 has an enlarged forward portion to accommodate the rod portion 80. The portion 80 of the rod structure extends out of the cylindrical member 60 and terminates within the interior of the tubular member 64. The forward end of the rod portion 80 is received between a pair of blade structures 84, 86. The blade structures 84, 86 have enlarged portions 88, 90 with opening therethrough. Transversely extending pins 92, 94 extend through the openings in the enlarged portions 88, 90 to thereby slidingly mount the blade structures 84, 86. The width of these blade structures is slightly greater than the radius of the interior of the tube 64. The blade structures are thus capable of a degree of transverse movement somewhat less than the length of the radius of the tube interior.

The blade structures 84, 86 extend from the pins 92, 94 to the forward end of the tube 64. The disc-shaped end cap 96 is provided at the forward end of the tube 64. The end cap 96 has a portion 98 of reduced diameter which is press fitted into the tube end. An opening 100 is provided in the end cap 96. The opening 100 extends diametrically across the end cap. The forward end of the blade structures 84, 86 project through the opening 100. A sensing finger or element 102, 104 is provided on the forward end of each of the blade structures. The fingers or elements 102, 104 are at right angles to the blades. The fingers are flat striplike members and are guided in a recess 106 provided in the outer surface of the end cap 96. In the closed position of the bore gauge 10, the inner ends of the fingers 102, 104 abut against each other. In this position, the outer ends 108, 110 of the fingers form an extension of the circumference of the end cap 96. It will be noted that the ends 108, 110 are curved to match the curvature of the end cap. A protective cover 112 is secured to the end cap 96 by means of screws 114.

A diagonally extending recess 116, 118 is provided in the oppositely disposed faces of the blades 84, 86. Each of the recesses extends substantially from corner to corner of the blades. The recesses are oppositely angled so that they intersect each other regardless of the position of the blades. A small pin 120 is provided in the forward end of the rod structure 68. The pin 120 extends outwardly from the rod structure and has an end received in each of the recesses 116, 118. In operation, as the slide 22 is moved along the dial caliper 12, the rod structure 68 is caused to move longitudinally with respect to the tube 64. The pin 120 thus slides in the recess 116, 118 at the point of intersection of the recesses thus camming the blades 84, 86 to move them transversely to either extend or retract the sensing fingers 102, 104.

Operation of the bore gauge may now be understood. As shown in FIGS. 3 and 5, the forward end of the tube 64 of the bore gauge is inserted into an opening 122 of a part 124 for the purpose of measuring the inside diameter of the circular slot 126. After the bore gauge 10 has been inserted a sufficient distance into the part 124, the slide 22 is caused to move along the dial caliper 12 towards the part 124. As above described, this causes the sensing fingers 102, 104 to be projected radially outwardly of the bore gauge 10, movement of the slide 22 is continued until the outer ends 108, 110 of the sensing fingers contact the interior surface of the slot 126. The diameter of the slot is then directly read by first noting the position of the edge 52 of the slide 22. The number of the last indicia line 50 which the edge 52 has passed by is noted. This number is multiplied by 0.100. Then the position of the dial pointer 18 is noted. The figure indicated thereby is added to the previously noted figure to result in a direct reading of the inside diameter of the slot 126.

The bore gauge is illustratively shown measuring the slot 126 of the part 124 to indicate that the gauge is capable of measuring the inside diameter of a slot which is relatively narrow. It has been difficult to measure such narrow slots with previous bore gauges because the physical dimensions of the sensing portion have been such as to prevent insertion into the slot.

The movement of the sensing fingers 102, 104 is correlates with movement of the slide 22 to permit direct reading of any particular measurement. In the arrangement illustrated, the sensing fingers 102, 104 move outwardly at a ratio of one to four with respect to movement of the slide 22. This is accomplished by setting the angle of the recesses 116 188 at approximately 14°2' with respect to the longitudinal axis of the device or at a ratio of one to two with respect to movement of the slide 22. This is accomplished by setting the angle of the recesses 116, 118 at approximately 26°34' with respect to the longitudinal axis of the device. The selection of this ratio is desirable because it permits utilization of conventional dial indicators 14. Conventional indicators are available with unit calibrations of 0.001 inch. It is only necessary to change the faceplate to utilize the alternate indicia marks and renumber the faceplate to so correspond.

What I claim as my invention is:

1. A bore gauge for measuring the inside diameter of an opening in a workpiece comprising a generally cylindrical tubular body having a longitudinally extending axis, an end wall on one end of said tubular body, a diametrically extending centrally located slot in said end wall, said axis being perpendicular to and intersecting said slot, an elongated rod structure extending into the other end of said tubular body and movable longitudinally relative thereto along said axis, a pair of oppositely extending camlike projections on the inner end of said roll structure, a pair of generally flat blades in said tubular body adjacent said one end thereof, said blades having oppositely facing surfaces and inner and outer ends, a pair of mounting pins transversely extending through and being carried by said tubular body in parallel relation, said pins being located on opposite sides of said longitudinal axis, means on the outer ends of said blades for mounting each of said blades on one of said pins to hold said blades against longitudinal movement and to permit said blades to be independently displaced along said pins transversely of said longitudinal axis, relatively thin fingerlike sensing elements secured to the inner ends of said blades in perpendicular relation, each of said sensing elements being located in opposite portions of said diametrically extending slot and movable in opposite directions for extension into contact with or retraction from the inside diameter of the opening in the workpiece, the oppositely facing surfaces on said blades each having a diagonally extending recess therein extending diagonally across the surface, said recesses being at reverse angles with respect to each other whereby the recesses cross each other, said camlike projections on said rod structure extending into said recesses at the point of crossing thereof whereby displacement of said rod structure along said longitudinal axis causes said projections to cam said blades to result in simultaneous movement thereof in opposite directions along said mounting pins and movement of said sensing elements in said slot, and means to measure the displacement of said rod structure.

2. The bore gauge as defined in claim 1 wherein each of said diagonally extending recesses on the oppositely facing surfaces of the blades start at one edge of the blade near the outer end thereof and terminate at the opposite edge of the blade near the inner end thereof.

3. The bore gauge as defined in claim 1 wherein said pins are elongated and have their axes perpendicular to the longitudinal axis of said tubular body.

4. The bore gauge as defined in claim 1, and further characterized in the provision of a cap on said other end of said tubular body, said cap being of substantial thickness and having an opening therethrough, said rod structure having an intermediate portion configured to mate with said opening and received through said opening whereby said rod structure is guided thereby in its movement.

5. The bore qauge as defined in claim 4, and further characterized in that said rod structure has a forward portion extending from said intermediate portion into said tubular body and between said blades, said forward portion being relatively thin to fit between said blades when said blades are spaced closely together.

6. The bore gauge as defined in claim 5, and further characterized in the provision of an elongated linear caliper fixed to said tubular body and extending rearwardly therefrom, a slide structure slidably mounted on said caliper, a dial indicator mounted on said slide structure and operatively connected to said caliper to register movement of said slide structure along said caliper, said rod structure having a portion extending exteriorly of said tubular body and connected to said slide structure to permit said rod structure and slide structure to move together.

7. The bore gauge as defined in claim 5, and further characterized in that the angle of the recesses in the blades is correlated with the movement of said rod structure to result in a predetermined ratio of movement of the sensing elements with respect to the movement of the rod structure along the longitudinal axis of said tubular body.